United States Patent
Walker et al.

(10) Patent No.: US 6,864,687 B2
(45) Date of Patent: Mar. 8, 2005

(54) ELECTROSTATIC SENSOR DEVICE AND MATRIX

(75) Inventors: James T. Walker, Palo Alto, CA (US); Christopher I. Walker, Pasadena, CA (US)

(73) Assignee: Amfit, Inc., Santa Clara, CA (US)

(*) Notice: Subject to any disclaimer, the term of this patent is extended or adjusted under 35 U.S.C. 154(b) by 111 days.

(21) Appl. No.: 10/210,316

(22) Filed: Aug. 1, 2002

(65) Prior Publication Data

US 2003/0030443 A1 Feb. 13, 2003

Related U.S. Application Data

(60) Provisional application No. 60/309,229, filed on Aug. 1, 2001.

(51) Int. Cl.[7] .......................... G01N 27/60; G01R 27/26
(52) U.S. Cl. ..................... 324/452; 324/442; 324/662
(58) Field of Search ................. 324/442–452, 324/658–663; 73/172

(56) References Cited

U.S. PATENT DOCUMENTS

| | | | |
|---|---|---|---|
| 4,152,748 A | 5/1979 | Arkans | 361/283 |
| 4,509,527 A | 4/1985 | Fraden | 128/671 |
| 4,562,430 A * | 12/1985 | Robinson | 324/660 |
| 4,862,743 A | 9/1989 | Seitz | 73/172 |
| 4,972,154 A * | 11/1990 | Bechtel et al. | 324/663 |
| 5,088,503 A | 2/1992 | Seitz | 128/779 |
| 5,430,381 A * | 7/1995 | Dower | 324/452 |
| 5,449,002 A | 9/1995 | Goldman | 128/774 |
| 5,659,395 A | 8/1997 | Brown et al. | 356/376 |
| 5,678,448 A | 10/1997 | Fullen et al. | 73/172 |
| 5,729,905 A | 3/1998 | Mathiasmeier et al. | 33/3 R |
| 5,775,332 A | 7/1998 | Goldman | 128/774 |
| 5,790,256 A | 8/1998 | Brown et al. | 356/376 |
| 6,029,358 A | 2/2000 | Mathiasmeier et al. | 33/3 R |
| 6,033,370 A | 3/2000 | Reinbold et al. | 600/595 |
| 6,331,893 B1 | 12/2001 | Brown et al. | 356/601 |

* cited by examiner

Primary Examiner—Vincent Q. Nguyen
(74) Attorney, Agent, or Firm—Ohlandt, Greeley, Ruggiero & Perle, L.L.P.

(57) ABSTRACT

A system for electrostatically measuring the shape or pattern of objects including an array of sensor devices having the capability of responding, due to variable electrostatic coupling, to produce differentiated output signals when a sensor element forming part of each device is present and when it is not.

9 Claims, 6 Drawing Sheets

AXIS OF MOTION
THROUGH SENSING HOLE

ELECTROSTATIC SENSOR DEVICE AND MATRIX

CROSS-REFERENCE TO RELATED APPLICATIONS

This application claims the benefit of U.S. Provisional No. 60/309,229 filed Aug. 01, 2001.

FIELD OF INVENTION

The present invention relates to a system for measuring the location of gauge pins, and the like, and more particularly, for the purpose of thereby defining a shape or pattern in two or more dimensions, of objects or items that requires precise measurement. For example, such a system could be used to measure the size and shape of a person's foot, but could be exploited in a wide array of other measurement applications.

BACKGROUND OF THE INVENTION

One prior approach to the task of determining the shape of an object is to use a magnetic head captive inside a pin that is to be inserted into a receptacle or opening in a circuit board. Once inside the openings, a group of pins serves to outline the shape or pattern being measured. Then, when a Hall effect sensor, which is mounted on the circuit board, moves along the length of the pins it determines the magnets locations and hence the pins locations.

The Hall effect technique, because it involves an expensive device for making measurements for the purpose described and requires quite exact alignment of the parts involved has serious limitations in use. Accordingly, to overcome these limitations it is a principal object of the present invention to simplify the technique of measuring shapes and patterns of objects.

SUMMARY OF THE INVENTION

Briefly stated, the primary aspect of the present invention is defined as follows: A system for measuring the shape or pattern of objects electrostatically by having an array of sensor devices formed in a circuit board. Such sensor devices have the capability of responding differentiatedly to input signals when a sensor element is present at particular locations in the board and when it is not.

In a particular embodiment, the sensor device includes: A dielectric substrate material formed in two layers with a conducting plane between the two layers; a sensing hole which penetrates the dielectric substrate material from one outside surface to the other; a clearance hole in said conducting plane such that the conducting plane does not obstruct the sensing hole; and a conducting ring surrounding the sensing hole on each surface of the dielectric substrate.

The foregoing and still further objects and advantages of the present invention will be more apparent from the following detailed explanation of the preferred embodiments of the invention in connection with the accompanying drawings:

DESCRIPTION OF PREFERRED EMBODIMENT

Figure 1A:
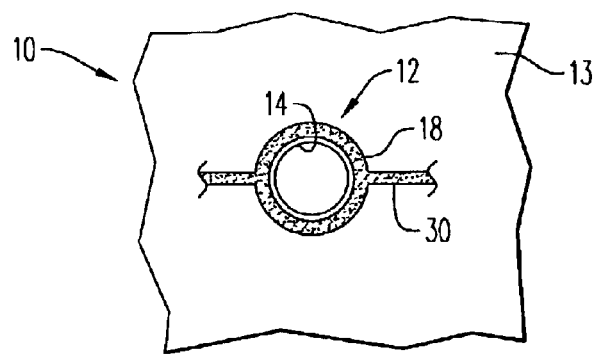
FIG. 1A is a top view of a sensor element formed in a dielectric printed circuit board.

Referring now to the Figures of the drawing and particularly for the moment to FIG. 1, there will be seen an electrostatic system 10 for measuring the shape or pattern of an object by sensing the location of gauge pins or the like.

Figure 1B:
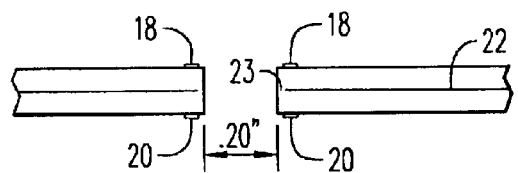
FIG. 1B is a side view of the sensor element.
Figure 1C:
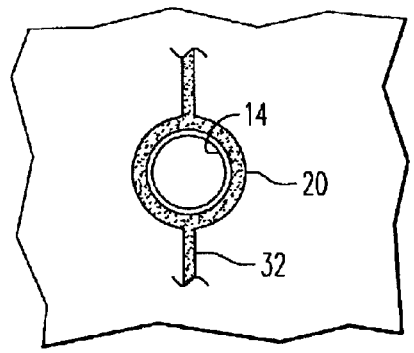
FIG. 1C is a bottom view of the sensor element.
Figure 1D:
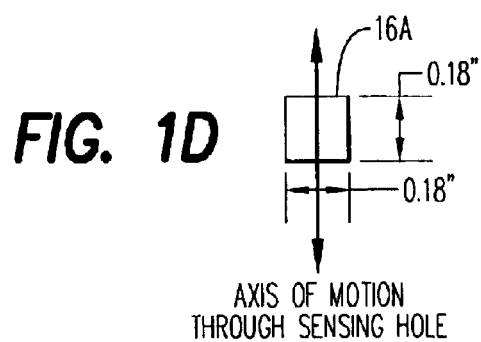
FIG. 1D is a diagram depicting a sensor element being sensed.

The system of sensor devices 12 is conveniently fabricated in a printed circuit board matrix by employing standard fabrication facilities to produce spaced holes or openings 14 for receiving the selectively inserted pins 16. Arranged with specially designed parts, the openings 14 function as cooperative sensor elements with the movable elements in the form of pins 16. Thus, an, etched metal drive ring 18 surrounds the upper end of each hole 14 in the circuit board (FIG. 1A), (the ring having, for example, 0.290 OD and 0.230 ID in inches. Likewise, an etched metal sense ring 20 surrounds the lower end of each hole 14 (FIG. 1C). A metal shield layer 22 extends throughout the matrix 12 and is suitably provided with clearance holes 23 (0.240 ID) as indicated in FIG. 1B.

Figure 7:
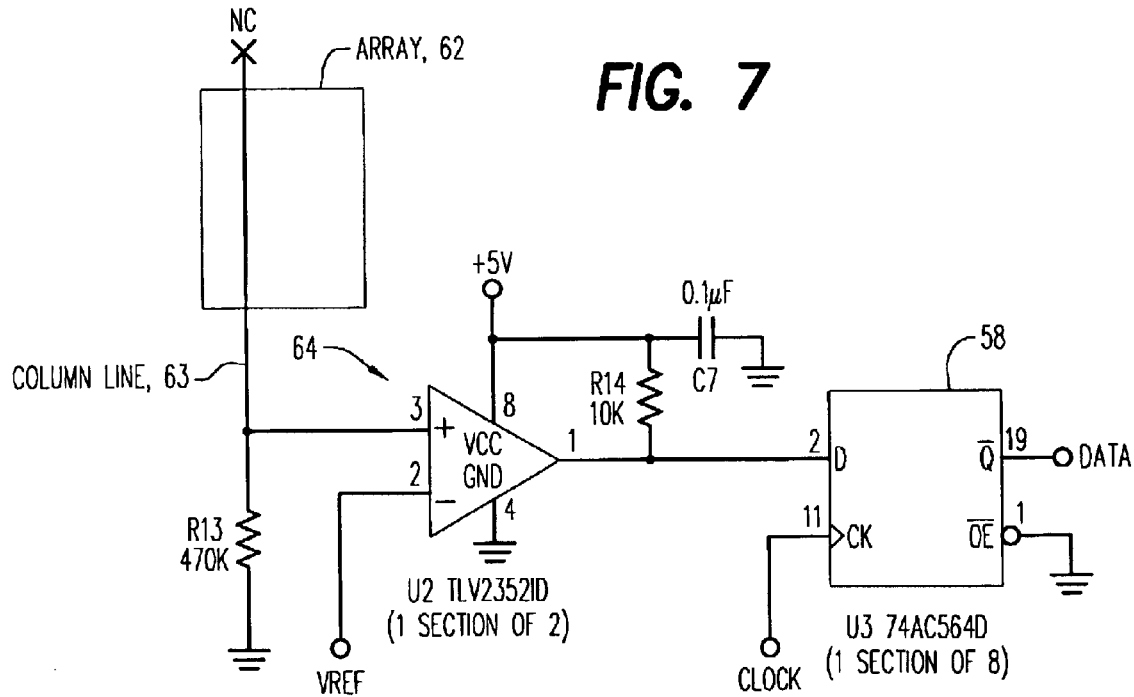
FIG. 7 is a schematic diagram of a sense amplifier and latch seen in FIG. 2.

It will be seen that a trace connection 30 (FIG. 1A) for operation of the system extends from the ring 18 to a suitable pulse drive source (FIG. 4), while a trace connection 32 (FIG. 1C) extends to a suitable sensing circuit (FIG. 7). Each of the trace connections 30 and 32 would preferably be formed to have a width of approximately 0.040 inches.

It will be appreciated that a sensor device 12 outputs a signal coupled by the capacitance between the two etched metal rings 18 and 20, as coupled through the dielectric printed circuit board 13, and the sense element, for example, in the form of a pin 16 (FIG. 10), placed in the sensing hole 14. For the dimensions given, the output signal will change by about a ratio of 4 to 1 when the empty hole is filled with a metal cylinder 16A formed in a zone of the pin which has a clearance all around of about 0.01 inch. This signal change can be sensed by a sensitive amplifier or comparator, and the result stored in a memory element for later use, as will be shown and explained in an embodiment.

Operation of the electrostatic sensor system begins with a drive pulse being used to excite the etched metal ring 18 on the top surface of the sensor area and surrounding the hole or opening 14. The metal ring 18 is fabricated to have a small clearance, such as 0.015 inch, all around the hole drilled through the printed circuit board. This clearance prevents direct contact between a conductive cylinder and the ring, for more repeatable performance. The trace connection 30 on the top surface of the printed circuit board connects the ring 18 to a source of drive pulses, and to additional rings if desired. As seen in the side view (FIG. 1B) of the printed circuit board 13, the ring is fabricated over a metal ground plane (shield layer 22) buried in the middle of the printed circuit board's thickness. The ground plane has a clearance hole 23, already noted, surrounding the sensing hole 14. The clearance hole is drilled through the printed circuit board, so it cannot directly touch the metal cylinder that is intended to be placed in the center of the sensing hole.

The bottom of the circuit board has a similar ring 20, used for sensing the amount of drive signal coupled by the electrostatic capacitance between the metal cylinder and the drive signal ring. A small capacitance exists between the cylinder and each ring, passing predominantly through the dielectric material and the air gap around the cylinder. A small amount of additional coupling occurs directly in the air above the ring to the cylinder on each side of the printed circuit board. Note that the sense ring has a small clearance around the drilled hole, such as 0.015 inch as before. A trace connection 32 on the bottom surface connects the ring to a sense amplifier for monitoring coupled pulses, and additional rings if desired.

When the center of the drilled sensing hole 14 is empty, there is still a small amount of coupling through the hole between the drive and sense rings. As an example, for the dimensions given and in a matrix array of 36 columns by 16 rows, the residual signal with a 10-volt drive pulse will be about 14 millivolts. If now the hole is filled with a 0.18 inch diameter by 0.18 inch long metal cylinder on a dielectric support, the signal received by the sensor ring will increase to about 63 millivolts. This signal increase of more than a factor of 4 is sufficient for reliable sensing of the presence of the metal cylinder in the sensing hole. When the sensing hole is filled with a dielectric cylinder of 0.18 inch outside diameter, the signal received will increase to about 20 millivolts. Thus the ratio of signal amplitudes between metal and dielectric cylinders is sufficient for reliable detection as before. Partial entry of the metal cylinder into the sensing hole 14 produces a corresponding analog response, and the subsequent signal processing amplifier will make the distinction of how much signal is needed to produce a digital output. If the grounded shield plane in the center of the printed circuit board thickness is omitted, the stray coupling between the drive and sense rings increases greatly, and there is insufficient signal variation for reliable sensing.

Referring now to FIG. 8, the sensor elements disclosed above can be arranged, as previously alluded to, in a two-dimensional array or matrix, with the drive rings connected together along one array axis, and the sensing rings connected together along the other array axis. Designate the drive rings connected together as being in rows, and the sense rings connected together as being in columns. Then if M rows and N columns are used, it is seen that one of the great advantages of this design is that M times N sensor elements are accommodated by using only M drive pulse sources and N sense amplifiers. The sense elements themselves are simply etched patterns with holes drilled in the printed circuit board, so they can be inexpensively massproduced. No special electronic circuitry is required, as in the prior art, at each sensor location, so a substantial cost saving can result. For the case of 16 rows and 36 columns, a total of 576 separate locations can be sensed and still require only 52 independent signals and sets of circuitry. In the case of interest here, the sensor elements are arranged in a uniformly spaced rectangular array with a spacing of 0.315 inch between centers in both row and column directions. With the ring outside diameter of 0.290 inch, this gives a clearance space of 0.025 inch between the outside diameters of rings in adjacent columns.

It should be noted, in connection with FIG. 8, that during experimental measurements of prototype sensor elements, it was discovered that having the sensor rings closely spaced as above could lead to significant cross-coupling between adjacent columns. Specifically, if a signal were induced in one column by an active sensor, the columns adjacent to it on either side could have induced signal amplitude of 3.7 percent of the signal on the active column. Since the sensor operation is essentially analog, and distance measurements will be made according to when the sensor output crosses a reference threshold, this could cause errors in the measured distance values. This effect is possible on the sensor ring side of the sensor elements because the sense amplifier chosen for economic reasons permits significant signal voltage to be developed on each column line. Stray coupling on the row drive side between rings is not of importance since the row drive signals come from a low impedance source, and the row lines are loaded with additional bypass capacitors. If an additional amplifier with a low input impedance were used for each column, then the parasitic coupling would have no effect as there would not be any signal voltage on the column lines. The experimentally chosen method to reduce this undesirable effect is to place a thin, grounded metal trace connection 30 on the surface of the printed circuit board. This trace connection is placed so as to run in between the ring edges of adjacent sensor ring columns. With a clearance space of 0.025 inch available, a shielding trace reduces the induced parasitic coupling to less than 1.6 percent, which was judged acceptable for this application.

Figure 2:
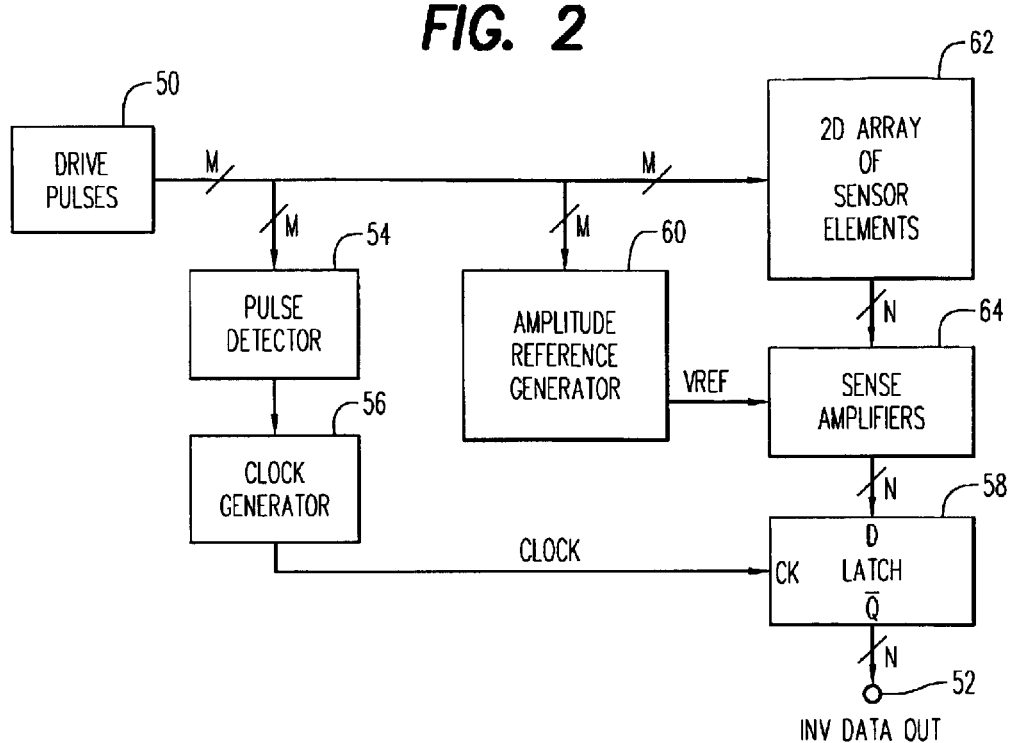
FIG. 2 is a block diagram of the electrostatic system for sensing the locations of the active sensor devices.

FIG. 2 is a block diagram of a sensing system. An external source of drive pulses 50 sends 10 volt amplitude pulses of 100 to 500 microsecond duration to the M rows of the sensor element matrix 13, one row at a time. The circuitry provided senses the presence or absence of a conducting cylinder, in the form of a metal zone 16A on sensing pin 16 (FIG. 10), in each sensor location in a driven row, and outputs that data on the N digital column outputs 52. Operation begins when the pulse detector determines that a pulse has occurred on one of the M input row lines. The pulse detector triggers a clock pulse generator 56, and the trailing edge of the clock pulse will be used to store the results of the sensing operation in a latch 58. An amplitude reference generator 60 produces a voltage output VREF during the pulse input that is a precise ratio fraction of the drive pulse amplitude. Each column from the sensor array 62 goes to an amplitude comparator, within the digital sense amplifier 64, which determines if the coupled signal from the sense ring on the driven row exceeds the VREF value. If the reference value is exceeded, the corresponding digital sense amplifier 64 output goes high. Otherwise, it stays low. Finally, the separately generated clock pulse stores the sense amplifier outputs from all the columns into a latch for later use. The N columns digital outputs are held until the next row is driven with a pulse.

Figure 3:
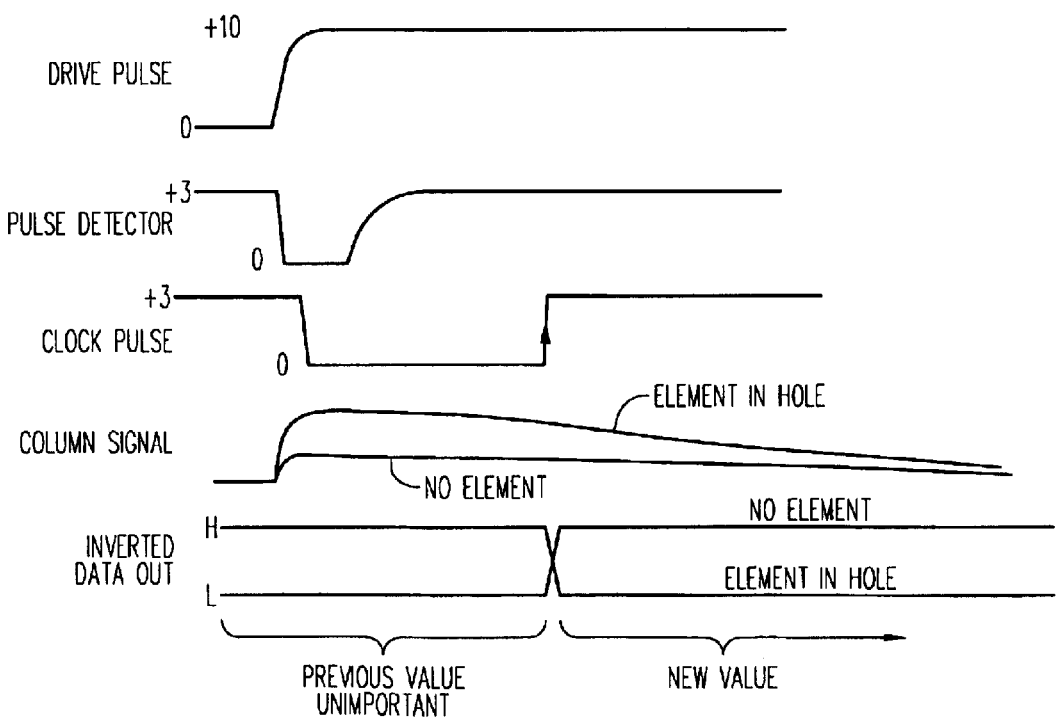
FIG. 3 is an operational training diagram.

A timing diagram for the sensing system operation is shown in FIG. 3. Operation begins with the drive pulse rising edge, which produces an output from the pulse detector 54 and the clock pulse generator 56. The column signal is proportionate to the drive pulse and coupling capacitance at its start, and varies according to the material occupying the sensing hole. Because the coupling capacitance is very small (typically 0.1 picofarad), the row capacitance is typically 30 picofarad, and the sense amplifiers 64 have a finite input impedance of 470 kilohms, the column signal decays to zero with a time constant of about 15 microseconds. For this reason, the digital output of the sense amplifiers must be saved in a latch for later use. The clock pulse occurs about 2 microseconds after the drive pulse rising edge to do this data storage. No data is altered at the trailing edge of the drive pulse, although there is a signal coupled into the column lines. Normally the drive pulses will have their width established such that the response caused by the trailing edge of one pulse will not interfere with the desired response from the leading edge of a following pulse. More than one pulse may be high at a time without causing problems because of the 15 microsecond time constant being short in relation to the drive pulse width.

It is important to note that in the above description, the value of VREF used for the sense amplifier comparison is derived from the input drive pulse and will have an exactly proportionate amplitude. In a similar manner, the signal from the sense column will depend on the capacitance matrix of the sensing element and the element being sensed. This capacitance matrix produces a division of the drive pulse which depends only on physical dimensions and the conductive cylinder location. Therefore the use of a VREF derived from the drive pulse amplitude to compare with a signal also derived from the drive pulse amplitude results in a system which to the first order is independent of the actual drive pulse amplitude. This operational feature substantially improves the quality of performance and operating margins for errors. It also permits the use of the sensing system in different machines with various values of drive pulse amplitude, such as 10 volts in one machine and 24 volts in another.

Figure 4:
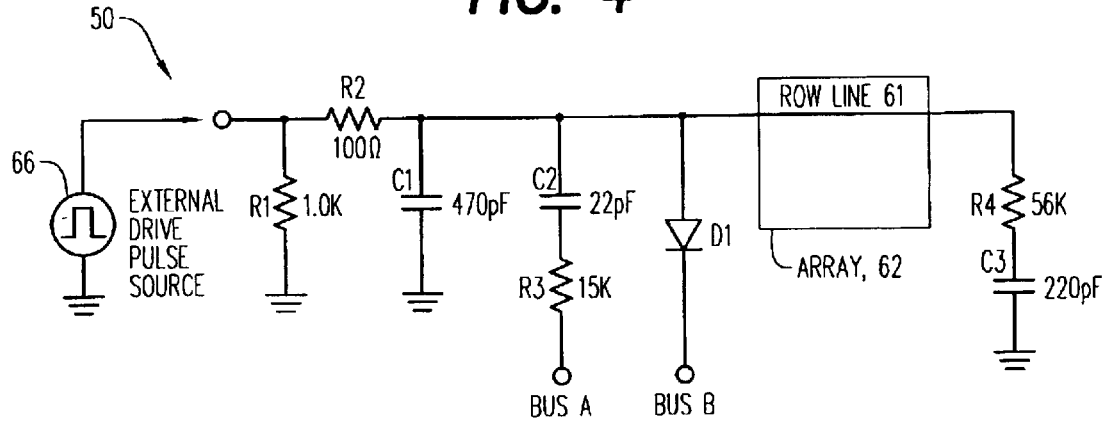
FIG. 4 is a schematic diagram of an array drive circuit for driving the X-Y array of sensor elements.

Each of the drive lines for the 16 row by 36 column sensor array has a circuit similar to the circuit schematic diagram shown in FIG. 4. The external drive pulse source can be represented as a voltage source 66 with its output going between 0 volts and +10 volts, and having a rise time of 100 nanoseconds and a fall time of 300 nanoseconds. This voltage source has an output impedance of less than 10 ohms. The drive pulse goes first to R1, a 1.0K resistor to ground. This causes the drive line to go to ground if not connected, and puts a minimum load on the drive pulse source for better performance. It then goes through R2, a 100 ohm resistor in series with the array line. This limits the driver current output if a short occurs elsewhere in the circuit. In addition R2 acts in conjunction with C1, a 470 pF capacitor as a low pass filter to limit high frequency noise from the drive pulse source being put on the drive line. The voltage on C1 then drives the row line in the sensor array. At the far end of the sensor array, the row line 61 is terminated in a series combination of R4, 56 ohms, and C3, 220 pF. This serves to terminate high frequency waveforms in a load similar to the characteristic impedance of the trace structure for the drive rings and connecting traces.

In addition to the above, each row line 61 has connections to bus A through a series combination of C2, 22 pF, and R3, a 15K resistor. This injects an impulse of charge into bus A whenever a row line makes a transition. A separate circuit described later uses the bus A signal to detect that a row pulse has occurred. Each row line also has connections to bus B through diode D1, a silicon small signal switching diode. Thus, whenever a row line is high, bus B will be pulled up to approximately the same voltage. This is used to generate the VREF voltage used in each sense amplifier 64, corrected in the respective columns of the array, for comparison with the sensor array output signals.

Each row line M in the sensor array has a total capacitance to the remaining circuitry of about 60 pF, for 36 drive rings and interconnecting traces. The transmission line surge impedance of this row line is approximately 56 ohms when constructed on FR4 epoxy-fiberglass printed circuit board material of 1/16 inch thickness.

Figure 5:
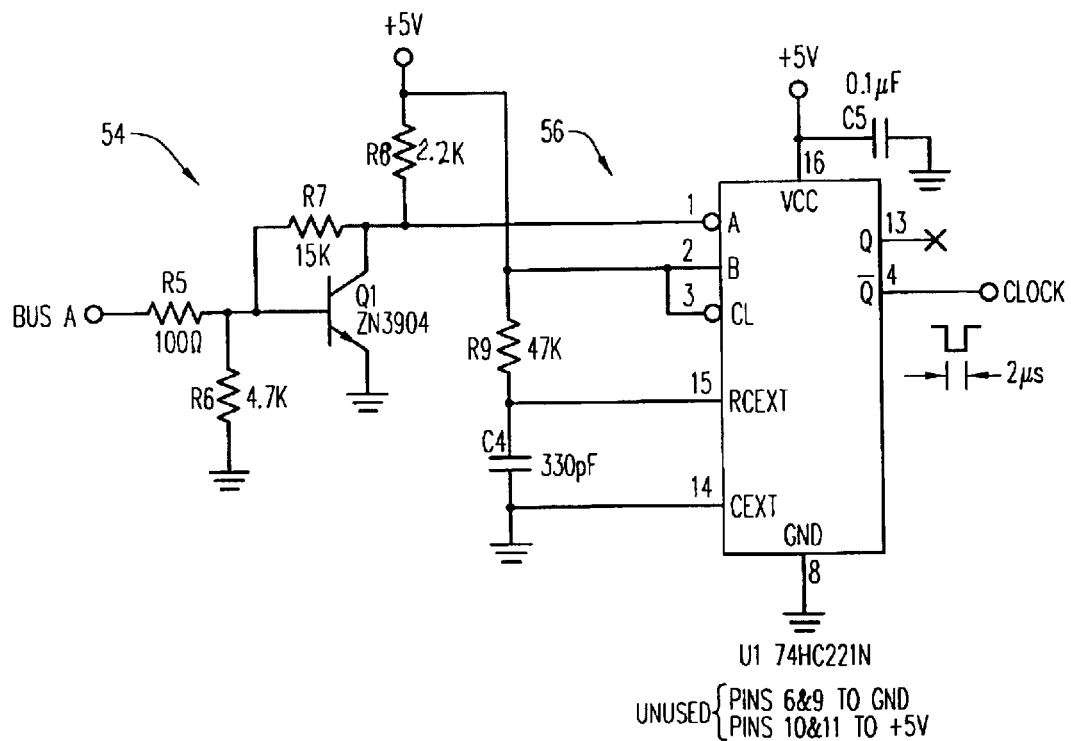
FIG. 5 is a schematic diagram of a pulse detector and clock generator, seen in FIG. 2, that are connected to the array drive circuit.

FIG. 5 shows the pulse detector 54 and clock generator 56 circuits. The input charge pulses caused by the row drive inputs go through a series resistor R5, 100 ohms, to the base of transistor Q1, a 2N3904 general purpose silicon amplifier. Resistor R8, 2.2K, serves as the load resistor for Q1 to cause it to operate as an amplifier, with resistor R7, 15K, providing feedback. Resistor R6, 4.7K, establishes the bias operating point so that the collector voltage will be about 4 times the value of Vbe for the silicon transistor. At room temperature with typical parts, this gives a quiescent voltage on the transistor collector of about +2.8 volts DC. When a +10 volt row line positive transition occurs, the charge coupled through C2 and R3 previously shown causes the transistor to saturate with its collector at about +0.1 volt. This saturation state remains for 700 nanoseconds, and the collector then returns to its quiescent voltage of +2.8 volts with a time constant of 30 nanoseconds. The falling edge of the voltage at the Q1 collector is connected to the A input of the monostable multivibrator U1, causing it to begin outputting a pulse. The other inputs are tied to +5 volts or ground as needed since they are not used. The output pulse width is set by the capacitor C4, 330 pF, and resistor R9, 4.7K ohms to a value of approximately 2 microseconds. The monostable output pulse is positive going at the pin Q, and goes from H to L at pin Qbar. Since the data latches used later respond to a rising edge and it is desired that they clock in data when the monostable pulse terminates, the Qbar output is used to drive the clock line to the latches. Capacitor C5, 0.1 uF, is a noise bypass for power to U1 as commonly practiced in the state of the art.

Figure 6:
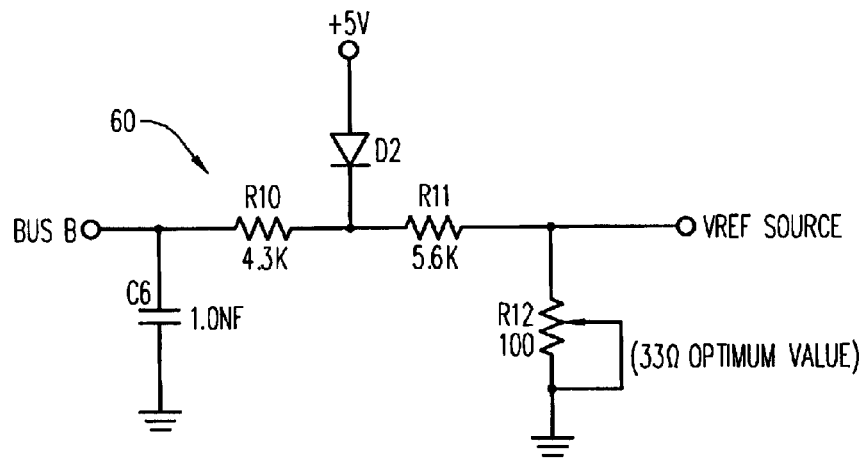
FIG. 6 is a schematic diagram of an amplitude reference generator seen in FIG. 2.

The amplitude reference generator 60 is shown in FIG. 6. This circuit takes the voltage developed on bus B, which is approximately equal to the row drive pulse, and produces a voltage VREF for use by the column sense amplifiers. First, capacitor C6, 1.0 nF, bypasses noise impulses to ground. Then resistors R10 and R11 in series operate as a voltage divider with adjustable resistor R12 to output a fraction of the bus B voltage as VREF. Diode D2, a silicon small signal switching diode, is connected to the tap between R10 and R11 to prevent its going below about +5 volts. In this way, VREF is kept from going to zero between row pulses, which would cause the sense amplifiers to receive both signal and reference inputs of zero. This prevents chatter and oscillations in the comparators used for the sense amplifiers.

The sense amplifier 64 and latch circuit 58 are shown in FIG. 7. One of the 36 column lines 63 from the sense element array is connected to a resistor R13, 470K, to ground to define the average DC signal level. It also goes to the + input of a comparator U2, a TLV2352ID, which serves as the sense amplifier. The comparator is a high gain amplifier which produces a digital output which is H if the + input is more positive than the − input, and L for the reverse state. The −input of the comparator receives the VREF voltage which represents the best level for discrimination between sense holes filled by a metal cylinder, and sense holes filled by a dielectric rod. This level is normally set to 35 millivolts by resistor R12 in FIG. 6. Power for the comparator is +5 volts provided to pin 8, with a 0.1 uF noise bypass capacitor C7. The ground return is pin 4. Output from the comparator is taken out on pin 1, which has a pull-up resistor R14, 10K, to +5V. The comparator output is an open drain stage, so a source of current to pull it up to a logic H level is needed. Output from the comparator also goes to the D input of the latch U3 (58), a 74AC564 octal inverting edge triggered latch, on pin 2.

The inverting form of the latch is used in this particular application so that the latched outputs will go low when a signal is received to give compatibility with other equipment. A non-inverting latch could be used to give similar results. When the clock signal from FIG. 5 makes a low to high transition on pin 11, the latch will store the present value on its D input and present it at its Qbar output on pin 19. At all other times, the value of the Qbar output is unchanged. The output enable bar for the latch on pin 1 is permanently connected to ground so the output always stays ON, since this function is not needed. Comparator U2 comes in a package with two sections. The remaining section is used for a functionally identical circuit not shown here. Latch U3 comes in a package with 8 sections, and the other sections are used for other columns not shown. A total of 18 dual comparator packages and 5 octal latch packages are used to make the circuitry for sensing and latching the outputs of 36 columns.

Figure 8A:
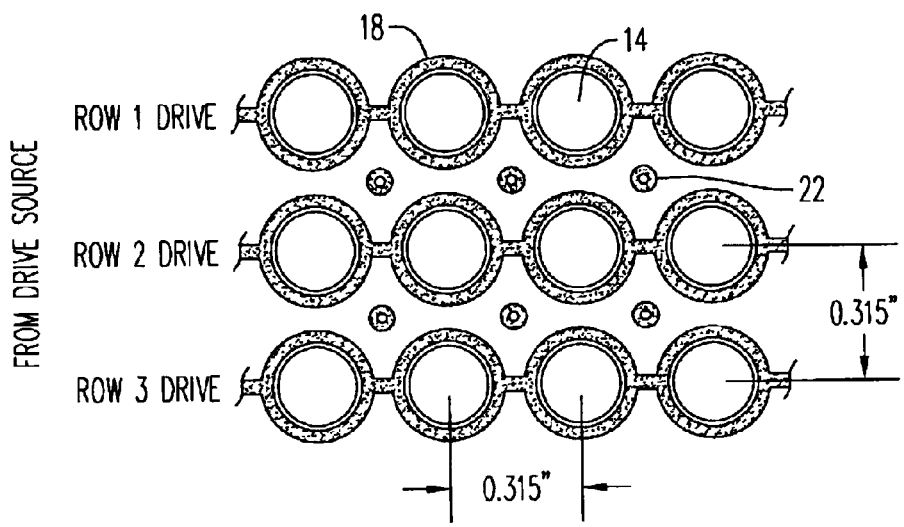
FIG. 8A is a top view of the sensor element array.
Figure 8B:
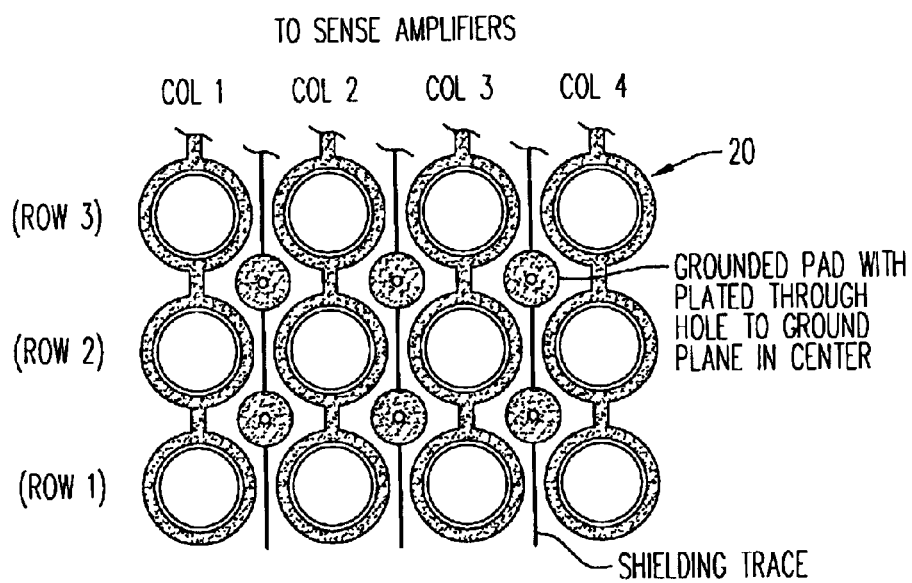
FIG. 8B is a bottom view of the sensor element array.

A portion of the sensor element array is shown in FIGS. 8A and 8B. It is made with elements as shown previously in FIG. 1 arranged in a uniformly spaced array with a center to center spacing of 0.315 inch. The array has 16 rows of 36 column, with shielding ground traces between each of the columns of sense rings to minimize parasitic coupling. The physical sensing array has the drive circuitry at one end of the drive rows, and the sense amplifiers located at one end of the columns. The arrangement is done so as to minimize the possibility of stray signals being coupled into the column sense lines and to minimize the length of traces on the column sense lines.

Figure 9:
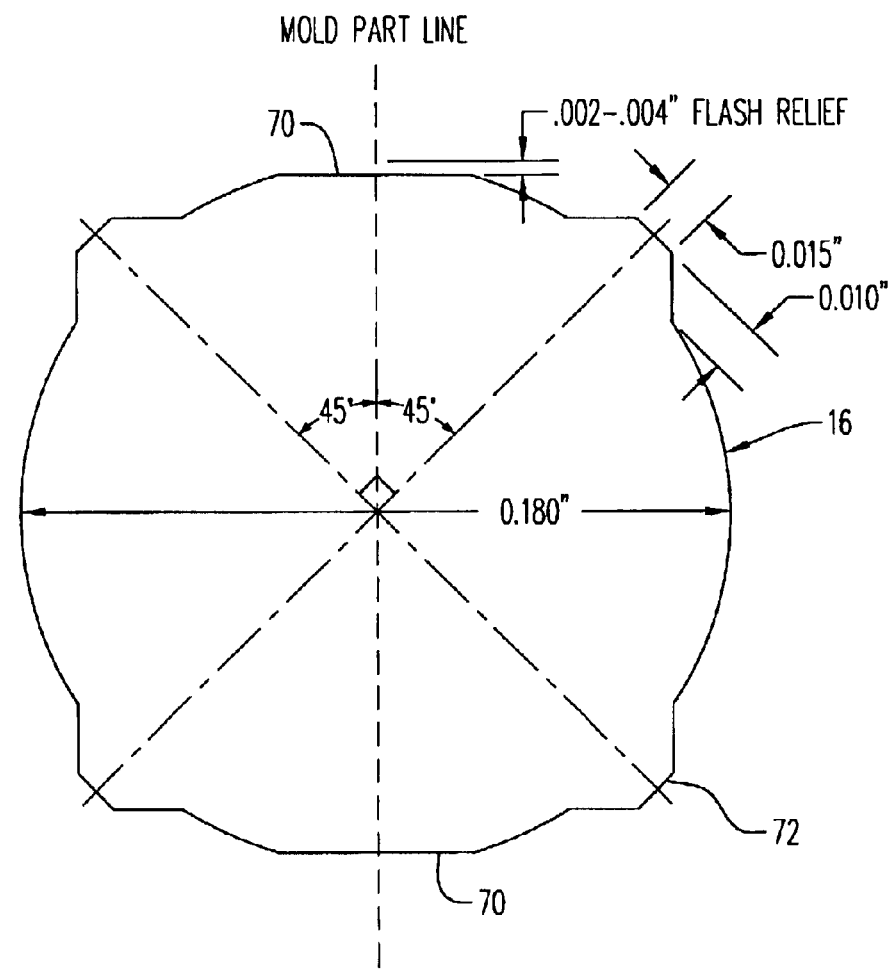
FIG. 9 is a cross-sectional view of a sensing element in the form of a pin.

A preferred form for the cooperating sensing pin 16 previously alluded to will now be described. FIG. 9 shows a cross-section of the pin at any point along the constant diameter portion of its length, drawn with a magnification of 20X. The pin is made with a nominally constant diameter of 0.180 inch for use in a sensor hole of 0.200 inch internal diameter. Two special features of the pin's cross-section are flattened sides 70 where the mold halves mate together to reduce problems with spurious mold flash protrusions, and small longitudinal ribs 72 to minimize abrasion of the cylindrical surface. The longitudinal ribs are sized so that their outermost surfaces are approximately 10 percent of the total circumference. The ribs protrude only 0.010 inch so that they enforce an air gap around the pin, but do not excessively widen the air gap. Equal spacing of the four ribs around the circumference provides support for all possible directions of abrasion.

Figure 10:
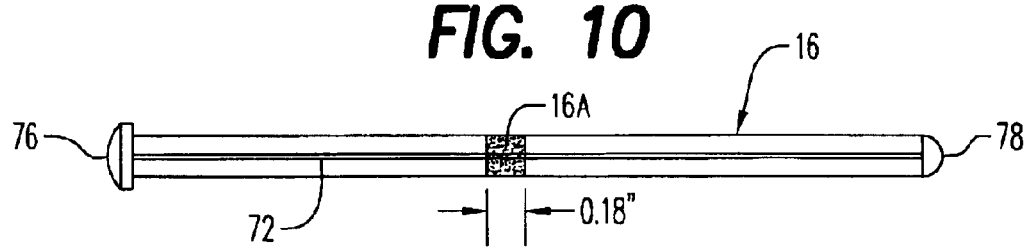
FIG. 10 is a profile view of the sensing pin.

FIG. 10 is a longitudinal view of the sensing pin 16 with one of the four longitudinal ribs detailed. At one end of the shaft, a button head 76 retains the pin in its equipment, preventing accidental loss of the pin. The pin normally protrudes through a metal sheet with appropriate holes for sliding motion. The other end of the shaft has a rounded shape to minimize the possibility of tissue damage when pressed against a soft surface. A special molding plastic is used for fabricating the pin that incorporates both fiberglass for strength and PTFE for built-in lubrication. The plastic has a very low conductivity, and behaves as an excellent insulator. At a location approximately halfway between the ends of the pin, a zone or region 80 of the plastic 0.18 inch long is made conductive with an evaporated metal coating. Since the sensor being used is very sensitive to electrostatic fields and draws essentially no current through the pin, the metal coating can be very thin. The sensor will work correctly for metal layers with sheet resistances of 10,000 ohms per square or less. A layer of chromium or aluminum with a thickness of only 4 microinches gives a sheet resistance of less than 0.5 ohm per square, and is partially transparent to the eye. For sturdiness, a chrome layer of 10 to 40 microinches is desired, but from the above numbers almost any layer thickness would do. The layer could be invisible and still be effective. It is important that the pin surface not intended to have conductive properties should not receive any evaporated metal, and the transition zone from metal to clear should not extend over more than about 0.02 inch of axial length at each end of the metal region.

The longitudinal ribs are now seen to serve the purpose of keeping motion of the pin in the sensing hole from rubbing the thin metal layer off of the surface of the pin. Friction will remove metal from the tops of the ribs, but they constitute a small portion of the total metal circumference. The overall sensor sensitivity should drop by less than 10 percent with wear and age.

The plastic pin 16 is injection molded from a mixture of a thermosetting plastic with 15 percent of fiberglass short fibers and 15 percent of PTFE added to the mixture. The pin is treated as needed to promote adhesion of the evaporated metal, and placed in a metal evaporation system. A system of metal masks in the evaporation system prevents metal condensation on the pin anywhere except the desired region as marked in FIG. 10. The pin is then ready for use in the electrostatic sensor device It should be understood that the foregoing description is only illustrative of the invention. Various alternatives and modifications can be devised by those skilled in the art without departing from the invention. Accordingly, the present invention is intended to embrace all such alternatives, modifications, and variances, which fall within the scope of the appended claims.

What is claimed is:

1. A system for electrostatically measuring the shape or pattern of objects comprising:
    an array of sensor devices having the capability of responding, due to variable electrostatic coupling, to produce differentiated output signals when a sensor element forming part of each device is present and when it is not, wherein said array includes M rows and N columns of sensor devices;
    a source of drive pulses connected to the M rows;
    a detector for determining that a pulse has occurred on one of the M input rows;
    a clock generator connected to the detector;
    sense amplifiers in the N columns for sensing the output signals from the sensor devices; and
    an amplitude reference generator connected to the M rows for providing a reference voltage such that if the reference value is exceeded, the respective sense amplifier output is stored.

2. A system as defined in claim 1, wherein the location or position of all of those sensor devices, that have the sensor element present so as to form a part of the device, defines the shape or pattern of the objects being measured.

3. A system as defined in claim 1 wherein the reference voltage is substantially proportional to an amplitude of the drive pulse.

4. A system as defined in claim 3, further comprising latches connected to the respective sense amplifiers for storing the sense amplifier outputs from all the columns.

5. A system as defined in claim 1, further comprising grounded shield traces between the N columns.

6. The system as defined in claim 1, wherein the array of sensor devices comprises a first and a second sensor element, further comprising:
    a dielectric substrate material formed in two layers, with a conducting plane between the two layers;
    a sensing hole which penetrates the dielectric substrate material from its upper surface to its lower surface, the first sensor element being receivable on said sensing hole;
    a clearance hole in the conducting plane such that conducting plane does not obstruct the sensing hole; and
    a first and second conducting rings surrounding the sensing hole on the upper and lower surfaces, respectively, of the dielectric substrate for defining the second sensor element.

7. The system as defined in claim 6, further comprising a signal source connected to the first conducting ring and a sensing circuit connected to the second conducting ring.

8. The system as defined in claim 7, wherein the first sensor element is a dielectric pin having a conductive region, such that when the pin is present in the sensing hole and a pulse is applied to the first conducting ring, a substantially large signal is transmitted by the sensing circuit connected to the second conducting ring.

9. The system as defined in claim 6, wherein an inner periphery of the first and second conducting rings are not exposed on the interior surface of the sensing hole.

* * * * *